Patented Nov. 3, 1942

2,301,103

UNITED STATES PATENT OFFICE 2,301,103

METHOD OF PREPARING NORMAL FERRIC SULPHATE

William S. Wilson, Brookline, and Neil A. Sargent, Winchester, Mass., assignors to Monsanto Chemical Company, St. Louis, Mo., a corporation of Delaware No Drawing. Application August 30, 1939, Serial No. 292,634

12 Claims. (Cl. 23—126)

The present invention relates to the manufacture of normal ferric sulphate in a uniform pellet form that is substantially completely soluble in water, anhydrous and free of sulphuric acid.

One of the principal uses for normal ferric sulphate depends upon its ability to coagulate from an aqueous solution over a comparatively wide range of pH values, forming a ferric hydroxide floc that is capable of carrying down with it suspended matter that may be present in an aqueous medium. This principle is commonly employed in the treatment of municipal and industrial water supplies and the clarification of waste water effluents. Ferric sulphate which is rich in sulphuric acid, commonly referred to as "acid sulphate," is lean in the ferric hydroxide forming principle; ferric sulphates which are rich in $Fe_2O_3$, commonly referred to as "basic sulphates," are of restricted solubility.

When ferric oxide and sulphuric acid react, a relatively large number of acid and basic sulphates, in addition to the normal sulphate, may be obtained, depending upon the condition of the reaction, the ratio of the ingredients, etc.

The following constitute some of the compounds which have been identified:

$Fe_2O_3 \cdot 4SO_3 \cdot 3H_2O$
$Fe_2O_3 \cdot 3SO_3$
$Fe_2O_3 \cdot 3SO_3 \cdot 6H_2O$
$Fe_2O_3 \cdot 3SO_3 \cdot 7H_2O$
$Fe_2O_3 \cdot 2SO_3 \cdot H_2O$
$Fe_2O_3 \cdot 2SO_3 \cdot 5H_2O$
$2Fe_2O_3 \cdot 5SO_3 \cdot 17H_2O$
$3Fe_2O_3 \cdot 4SO_3 \cdot 9H_2O$ According to the present invention, concentrated sulphuric acid, preferably over 85% $H_2SO_4$, which preferably is at a temperature of at least 10° C. is added to and admixed with finely ground ferric oxide, preferably in the form of burnt pyrite and of a fineness not substantially less than 200 mesh. The acid is added quickly and the mixing carried out under practically liquid conditions. A small quantity of water, dilute acid or aqueous ferric sulphate solution is then added to initiate the reaction and the mixture is discharged from the mixer into a reaction bin or pan where the chemical reaction takes place. As the reaction begins the temperature of the mass rises, vigorous steaming ensues and the mixture soon sets as a vesicular solid. The resulting solidified product is ground and subsequently pelletted by the addition of sufficient water, dilute sulphuric acid or aqueous ferric sulphate solution to induce agglomeration, but insufficient to develop pastiness. The pellets so formed are calcined by heating at 400–450° C. for 30–60 minutes or at a higher temperature for a shorter period of time. A substantially anhydrous acid-free product is obtained.

The conditions of operation of our process are such that the reaction between the oxide and the acid is completed quickly and without the application of external heat or use of a substantial excess of either reactant. This result is obtained by a combination of inter-related conditions which are more fully set forth hereinafter. The conditions of the mixing are important, especially the fineness of the oxide to the end that a rapid and complete reaction of the ingredients to form the normal sulphate is obtained.

Concentrated acid is important to our process although the exact concentration depends on many factors, such as the moisture present in the cinder, temperature of the reaction equipment, temperature of the reactants and the like. In general, it may be said that the concentration of the acid if cold should preferably be above 85% and the temperature of the acid should never be substantially below 10° C. or a poor conversion will result. We have found that 93% sulphuric acid is particularly well suited, although 98% acid or even oleum, that is acid containing an excess of $SO_3$ dissolved therein, may be used. Other conditions being the same, acids of increased strength increase the rate of reaction and raise the maximum temperature attained by the mass. We have found that in general a temperature above 140° C. must be attained and we prefer that the temperature rise considerably above this point during the reaction. The ferric oxide employed must have been ground to substantially completely pass through a 200 mesh screen and preferably to a fineness of 325 mesh. The fineness of the oxide is extremely important since we have found that if as small a proportion as 10% is larger than 200 mesh, substantially complete reaction of the ferric oxide cannot be obtained, and the resulting product is so impure as to be commercially valueless, since it must be reworked. Once the reaction begins in the bin a temperature of 160° is quickly attained due to the exothermic nature of the reaction. As the material hardens, the temperature rises 20–50° C. or even more, while at the same time steam is evolved, resulting in a vesicular solid product.

When ordinary pulverulent burnt pyrite is stirred with concentrated sulphuric acid, even vigorously, the mixture shows a marked tendency to agglomerate. If the mixture in agglomerated condition is allowed to set under more or less heat insulated conditions, the reaction with the oxide is incomplete, even when an excess of concentrated acid is used.

According to our invention, a complete and controllable reaction is possible if the burnt pyrite has been ground substantially completely to a fineness of at least 200 mesh and if the acid and pyrite in substantially theoretical proportions are mixed under practically liquid conditions. Ordinary mixing equipment may be employed for this purpose, the only requirement being that a good mixture be obtained before the reaction is initiated. A small quantity of water, dilute acid or dilute aqueous ferric sulphate solution is then added to the mixture to initiate the reaction and the fluid mass discharged into a reaction bin or pan in which the reaction takes place.

Considerable leeway may be taken in the mixing operation, although, in general, we prefer to charge the mixer initially with all the oxide and then to quickly add the entire amount of acid. The mixing is then carried out over a period of about 3-5 minutes although mixing times as long as 15 minutes may be employed in many instances if desired. A small proportion of water, dilute acid, or aqueous ferric sulphate solution is added and the mixture discharged into the reaction bin in a very fluid, almost liquid state. The reaction takes place in the bin and goes substantially to completion, the temperature rising to 180-210° C. or even higher. During this time, steam is evolved in large quantities. However, when proceeding as described herein, we have experienced no difficulty from explosions.

No external heat is necessary, in fact it may become necessary to abstract heat from the reaction bin by jacketed cooling means or use of somewhat more dilute acid in order to avoid loss thereof by volatilization. Excess acid is thus avoided, the normal sulphate is produced to the exclusion of the acid or basic sulphates, yet the mixture is substantially completely reacted, which is important since the subsequent calcination is not an effective means for completing this phase of the reaction.

For many industrial purposes this material will be found to be entirely satisfactory. However, for other purposes a reduction in the amount of ferrous iron, free sulphuric acid and water of hydration is desirable. Moreover, the material displays a tendency to dust and is non-uniform in size. In order to improve some of these qualities of the product, it is removed from the reaction bin, crushed and calcined at 400-450° C. or higher, preferably in contact with an oxidizing atmosphere. This operation results in the oxidation of ferrous sulphate to ferric sulphate and some unreacted ferric oxide is combined with residual sulphuric acid.

The calcined product though non-uniform will be found to have many of the desirable properties of the preferred product which is made by adding water to the crushed material in a rotating drum type mixer as, for example, a cement mixer, or in an agitating device similar to a screw conveyor. The water so added tends to agglomerate the particles. The amount to be added will vary according to the requirements of the material being agglomerated, the size of pellets desired, the rate of agitation, etc. In general, one may add water in an amount capable of being taken up by the sulphate as a hydrate. Assuming that the raw material being agglomerated contains the equivalent of three molecules of water of crystallization, three or four more mols of water, or approximately 10% or 12% on the weight of the crushed ferric sulphate will be found sufficient. The amount of water which is added is sufficient to induce agglomeration, but insufficient to form a paste. In general we prefer to restrict the amount of water as much as possible, while at the same time accomplish agglomeration.

If aqueous ferric sulphate is used in lieu of water to agglomerate the crushed material, especially in the absence of free sulphuric acid, the temperature of the mixing should be restricted in order to avoid the formation of insoluble basic sulphate. Obviously, if the formation of a small amount of insoluble ferric sulphate is not of consequence, this precaution need not be observed. It has been found that, other factors being constant, a stronger pellet is formed by the use of ferric sulphate solution than is obtained when water alone is the agglomerating agent.

The agglomerated product which is obtained will be found to be extremely hard, dense, and susceptible to rough handling without suffering from self-abrasion or decrepitation. In this form it will be found to be suited for storage or shipment. However, we prefer to complete the processing by subjecting the product to calcination, observing the same temperature limitations mentioned hereinabove, whereby a substantially acid-free anhydrous normal ferric sulphate product is obtained which is very low in insoluble materials, especially the basic ferric sulphates and unreacted ferric oxide, and is extremely low in ferrous sulphate. A certain amount of dust is usually evolved by the calcination operation which may be recovered in any of the customary dust collection systems. This dust may advantageously be dissolved in water and the resulting ferric sulphate solution used to agglomerate the product and form pellets, or to initiate the reaction after the reactants are mixed.

The presence of a small amount of free sulphuric acid in the material undergoing calcination is not objectionable since it reacts with residual ferric oxide and inhibits the formation of basic sulphates and, lastly, makes possible the oxidation of ferrous sulphate.

To illustrate a specific embodiment of the application of the principles of our invention, a mixer of suitable size is charged with 90 pounds of pyrite cinder which has been ground to a fineness of 325 mesh. To this cinder, 160 pounds of 93% sulphuric acid are added quickly, that is, within 1 or 2 minutes, while the mixer is in motion. The amount of acid added will produce a thin slurry. The mixing is continued until the acid and oxide are considered to be evenly distributed and then 8 pounds of 45% sulphuric acid are added and the mixture immediately discharged into an iron lined bin or pan. The time required for discharging the material usually does not exceed 1 or 2 minutes. The reaction will shortly begin and a temperature of 180-210° C. will eventually be attained with evolution of steam. The temperature will reach a maximum and remain there relatively constant, probably due to the volatilization of water. The evolution of steam continues for about one-half hour, during which the mass swells and cracks develop on the surface. The reaction is thus completed.

As the evolution of steam subsides and the temperature drops, the mass contracts somewhat and can, in this form, be easily removed from the pan. Usually the reaction time after the mixing extends for about five hours.

To produce pellets the material is ground so that practically all will pass through an 8 mesh screen, after which it is introduced into a cement mixer which preferably is fitted to receive the ground material and a stream of water continuously at one end, and is tilted or otherwise adapted to discharge the agglomerated product from the other end. In this operation, the rotating drum or mixer functions not only to agglomerate the particles of ferric sulphate, but also to classify the finished product, inasmuch as the rotation of the drum stratifies the particles or pellets according to size. The small particles sift to the lower strata, whereas the larger agglomerates remain in the upper layer, from which layer the agglomerated product is withdrawn preferably continuously.

The amount of water added to effect agglomeration is equivalent to approximately 12% of the weight of the reacted mass charged into the rotating mixer. Some heat is generated by reason of the addition of water to the ferric sulphate and the agglomerated product will be found to be hot and moist. If desired, it may be dried and cooled by means of a blast of air, or it may be calcined by raising it to a temperature of 400–450° C. for 30–60 minutes. If desired, the material may be subjected to a higher temperature, say 500–600° C., but for a shorter period of time to avoid decomposition of the sulphate product. A typical calcined product has been found to have an analysis which is substantially as follows, and has the desirable properties hereinbefore described:

|  | Per cent |
|---|---|
| $Fe_2(SO_4)_3$ | 92.5 |
| $FeSO_4$ | .5 |
| $Al_2(SO_4)_3$ | 1.0 |
| Insoluble | 6.0 |

The analysis of the product will vary with the composition of the ferric oxide raw material employed since the other oxides or impurities, such as silica, in the raw material will remain in the ferric sulphate product.

The pellets of ferric sulphate obtained by our process are more or less globular, have a somewhat roughened surface but pour easily, do not tend to set up or cake readily and are of relatively uniform size, free from fines and all pass through a 4 mesh screen.

What we claim is:

1. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness of at least substantially 200 mesh with said sulphuric acid in such a manner as to obtain a thin slurry without substantial reaction taking place during the mixing, then adding a small proportion of an aqueous substance to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate.

2. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness varying between about 200 and 325 mesh with said sulphuric acid in such a manner as to obtain a thin slurry without substantial reaction taking place during the mixing, then adding a small proportion of dilute sulphuric acid to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate.

3. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness of at least substantially 200 mesh with said sulfuric acid and in such manner as to obtain a thin slurry without substantial reaction taking place during the mixing, then adding a small proportion of water to the mixture to cause the mass to begin to react, removing the mass from the region of mixing, and maintaining the reacting mass in a quiescent state so as to obtain a temperature of approximately 180° C., thereby forming a solid, substantially dry porous product which is substantially completely reacted to normal ferric sulphate.

4. The method of preparing normal ferric sulphate which comprises reacting in substantially theoretical proportions ferric oxide with concentrated sulphuric acid of approximately 98% concentration by mixing ferric oxide of a fineness of at least substantially 200 mesh with said sulphuric acid in such a manner as to obtain a thin slurry without substantial reaction taking place during the mixing, then adding a small proportion of dilute sulphuric acid to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate.

5. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness of at least substantially 200 mesh with said sulphuric acid in such a manner as to obtain a thin slurry without substantial reaction taking place during the mixing, then adding a small proportion of an aqueous substance to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate, then grinding or pulverizing the product and subsequently agglomerating the same by the addition of an aqueous substance selected from the group consisting of water, dilute sulphuric acid, or aqueous ferric sulphate, thereby forming pellets of hydrated ferric sulphate, and then calcining the pellets to drive off the water.

6. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness of at least substantially 200 mesh with said sulphuric acid in such a manner as to obtain a thin slurry without substantial reaction taking place during the mixing, then adding a small proportion of dilute sulphuric acid to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate, then grinding or pulverizing the product and subsequently agglomerating the same by the addition of aqueous ferric sulphate in an amount equivalent to approximately 10-12% of the weight of the reacted mass while the material is agitated in a rotating type mixer wherein stratification of the finished agglomerated material promotes its continuous removal from the mixer, thereby forming pellets of hydrated ferric sulphate, and then calcining the pellets to drive off the water and to form hard ferric sulphate pellets.

7. The method of preparing normal ferric sulphate which comprises reacting in substantially theoretical proportions ferric oxide with concentrated sulphuric acid of sufficient concentration to form directly a substantially dry ferric sulphate product, by mixing ferric oxide of a fineness of at least substantially 200 mesh with said sulphuric acid in such a manner as to obtain a thin slurry without substantial reaction taking place during the mixing, then adding a small proportion of dilute sulphuric acid to the mixture to cause the mass to begin to react, removing the mass from the region of mixing, and maintaining the reacting mass in a quiescent state so as to obtain a temperature not substantially less than 140° C., thereby forming a solid, substantially dry porous product which is substantially completely reacted to normal ferric sulphate, and then calcining the product at a temperature of 400-450° C. for a period of 30-60 minutes or at a higher temperature for a shorter period of time whereby an anhydrous, substantially acid-free normal ferric sulphate product is obtained.

8. The method of preparing normal ferric sulphate which comprises thoroughly mixing theoretical proportions of finely ground ferric oxide and concentrated sulphuric acid of sufficient concentration to form directly a substantially dry ferric sulphate product, said acid being added quickly and in its entirety to said oxide to provide a thin slurry and to minimize reaction during the mixing, then adding a small proportion of an aqueous substance to the mixture to cause the mass to begin to react, removing the mass from the region of mixing, and maintaining the reacting mass in a quiescent state so as to quickly obtain a temperature of not substantially less than 140° C. and convert the mass into a solid, substantially dry porous product which is substantially completely reacted to normal ferric sulphate.

9. The method of preparing a normal ferric sulphate which comprises thoroughly mixing theoretical proportions of ferric oxide of a fineness of at least about 200 mesh and concentrated sulphuric acid of at least 85% concentration, said acid being added quickly and in its entirety to said oxide to provide a thin slurry and to minimize reaction during the mixing, the mixing being continued after said acid addition for a period of not more than about 15 minutes, then adding a small proportion of an aqueous substance to the mixture to cause the mass to begin to react, removing the mass from the region of mixing, and maintaining the reacting mass in a quiescent state so as to quickly obtain a temperature of not substantially less than 140° C. and convert the mass into a solid, substantially dry porous product which is substantially completely reacted to normal ferric sulphate.

10. The method of preparing normal ferric sulphate which comprises thoroughly mixing theoretical proportions of ferric oxide of a fineness of at least about 200 mesh and concentrated sulphuric acid of at least 85% concentration, said acid being added quickly and in its entirety to said oxide to provide a thin slurry and to minimize reaction during the mixing, the mixing being continued after said acid condition for a period of not more than about 15 minutes, then adding a small proportion of an aqueous substance to the mixture to cause the mass to begin to react, immediately removing the mass from the mixer and discharging it into a reaction bin, and maintaining the reacting mass in a quiescent state in said bin for a period of about 5 hours, so as to quickly obtain a temperature of not substantially less than 140° C. and convert the mass into a solid, substantially dry porous product which is substantially completely reacted to normal ferric sulphate.

11. The method of preparing a normal ferric sulphate which comprises thoroughly mixing theoretical proportions of ferric oxide of a fineness of at least about 200 mesh and concentrated sulphuric acid of at least 85% concentration, said acid being added quickly and in its entirety to said oxide to provide a thin slurry and to minimize reaction during the mixing, the mixing being continued after said acid addition for a period of not more than about 15 minutes, then adding a small proportion of an aqueous substance to the mixture to cause the mass to begin to react, removing the mass from the region of mixing, and maintaining the reacting mass in a quiescent state so as to quickly obtain a temperature of not substantially less than 140° C. and convert the mass into a solid, substantially dry porous product which is substantially completely reacted to normal ferric sulphate, then grinding or pulverizing the particles and subsequently agglomerating the same by the addition of an aqueous substance, thereby forming pellets of hydrated ferric sulphate, and then calcining the pellets to drive off the water.

12. The method of preparing normal ferric sulphate which comprises mixing in substantially theoretical proportions ferric oxide of a fineness varying between about 200 and 325 mesh and concentrated sulphuric acid of at least 95% concentration in such a manner as to obtain a thin slurry, removing the resulting slurry from the region of mixing before any appreciable reaction takes place, and then maintaining the reacting mass in a quiescent state so as to obtain a temperature not substantially less than 140° C., thereby forming a solid, substantially dry porous product which is substantially completely reacted to normal ferric sulphate.

WILLIAM S. WILSON.
NEIL A. SARGENT.

CERTIFICATE OF CORRECTION.

Patent No. 2,301,103. November 3, 1942.

WILLIAM S. WILSON, ET AL.

It is hereby certified that error appears in the printed specification of the above numbered patent requiring correction as follows: Page 2, second column, line 6, after the word and period "sulphate." insert the following sentence -

--The restriction of temperature may be attained conveniently by blowing air into the mixer whereby volatilization of water restricts the rise of temperature.--;

and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.